(12) United States Patent
Schraudolf et al.

(10) Patent No.: US 6,692,675 B2
(45) Date of Patent: Feb. 17, 2004

(54) METHOD OF PRODUCING A CONTROL VALVE ASSEMBLY

(75) Inventors: Joachim Schraudolf, Heilbronn (DE); Klaus Rentschler, Gaeufelden (DE); Helmut Neuschwander, Ludwigsburg (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 38 days.

(21) Appl. No.: 10/178,778

(22) Filed: Jun. 25, 2002

(65) Prior Publication Data

US 2003/0009881 A1 Jan. 16, 2003

(30) Foreign Application Priority Data

Jun. 27, 2001 (DE) .......................................... 101 31 109

(51) Int. Cl.$^7$ ................................................ B29C 45/14
(52) U.S. Cl. ....................... 264/242; 264/251; 264/275; 264/250
(58) Field of Search ................................. 264/242, 250, 264/251, 255, 259, 264, 275, 277; 137/15.25; 29/890.127, 890.132; 123/336; 251/308

(56) References Cited

U.S. PATENT DOCUMENTS

| | | | | | |
|---|---|---|---|---|---|
| 3,707,032 A | * | 12/1972 | Brunelle et al. | ............... | 29/460 |
| 3,774,879 A | * | 11/1973 | Zink | ........................... | 251/303 |
| 4,198,368 A | * | 4/1980 | Nightingale | ................ | 264/263 |
| 4,477,406 A | * | 10/1984 | Luchsinger | ................. | 264/275 |
| 4,671,746 A | * | 6/1987 | Sessody | ...................... | 417/437 |
| 4,914,711 A | * | 4/1990 | Rubinstein | .................. | 384/419 |
| 5,041,253 A | * | 8/1991 | Husted | ........................ | 264/251 |
| 5,049,341 A | * | 9/1991 | Rubinstein | .................. | 264/242 |
| 5,657,731 A | * | 8/1997 | Kim | ........................... | 123/336 |
| 6,261,499 B1 | * | 7/2001 | Okeke et al. | ............... | 264/242 |
| 6,263,917 B1 | * | 7/2001 | Evans | ........................ | 137/595 |
| 6,612,325 B2 | * | 9/2003 | Rentschler et al. | ...... | 137/15.25 |
| 2002/0056824 A1 | | 5/2002 | Rentschler et al. | ......... | 251/308 |

* cited by examiner

Primary Examiner—Angela Ortiz
(74) Attorney, Agent, or Firm—Crowell & Moring LLP

(57) ABSTRACT

A method for producing a control valve assembly using a mold comprising an upper mold half (20) and a lower mold half (21). A shaft (11) with premounted bearing blocks (13) or other functional components is placed in the mold, and the control valves subsequently are injection-molded on the shaft (11) in cavities (22) via feeders (23) to produce the control valve assembly. Afterward, the bearing blocks (13) can no longer be detached. Because they are produced separately, the bearing blocks can have a complex geometry. This allows a considerable degree of freedom in the geometric design of the control valve assembly while nevertheless ensuring cost-effective production.

8 Claims, 2 Drawing Sheets

METHOD OF PRODUCING A CONTROL VALVE ASSEMBLY

BACKGROUND OF THE INVENTION

The invention relates to a method for producing a control valve assembly in which control valves are originally formed by molding them onto a common shaft.

The control valve assembly to be produced is known, for example, from published U.S. patent application Ser. No. U.S. 2002/0056824 A1. This is a control valve assembly of the type that can be installed in the intake manifold of an internal combustion engine. According to the embodiment shown in FIGS. 3a, 3b, the assembly has a one-piece steel shaft 32, and the control valves 15 are assembly injection-molded onto this shaft. The assembly injection molding process further comprises the production of valve frames 16 in the same injection mold used to produce the control valves 15. This is achieved by opening a cavity by means of slide cores. The cavity for the control valves 15 is partly formed by the valve frames 16.

The described control valve assembly can be produced very cost-effectively by using an assembly injection molding process. However, due to the requirement that the control valve assembly should be produced in a single mold, it is not possible to produce geometrically complex parts. As a result, the valve frames 16 and the control valves 15 must have a simple geometry, so that additional functions of the control valve assembly cannot be realized geometrically.

SUMMARY OF THE INVENTION

It is an object of the present invention to provide an improved method of producing a control valve assembly.

It is also an object of the invention to provide a method of producing a control valve assembly which permits realization of geometrically complex structures.

It is a particular object of the invention to provide a method of producing a control valve assembly which enables cost-effective production of valve assemblies with complex geometric structures.

These and other objects are achieved in accordance with the present invention by providing a method for producing an assembly of control valves on a common shaft, wherein the control valves are originally formed by molding onto the shaft, the method comprising the steps of placing at least one prefabricated functional component on the shaft, the functional component having a closed passage in which the shaft is received; placing the shaft with the functional component thereon into a mold, and molding the control valves on the shaft with the mold such that the at least one functional component is located between two molded control valves; the molded valves preventing the functional component from being detached from the shaft.

The method according to the invention comprises the production of a control valve assembly on a common shaft, with the valves being originally formed on the shaft. This is made possible, in particular, by injection molding plastic valves onto the shaft. Other original formation techniques are also feasible, however. For instance, metal valves can be cast onto the shaft. Another option is use of powder metallurgical methods.

The method is characterized by the use of the following process steps. At least one prefabricated functional component is placed onto the shaft. For this purpose, the functional component is provided with a passage for the shaft and can therefore only be placed on the shaft starting from one of the shaft ends, since the passage in itself is closed.

The functional component can advantageously be provided with any complex structures. For example, injection-molded bearing blocks for the shaft can be placed on the shaft. They can, for instance, be configured with a demolding direction that is precisely perpendicular to the demolding direction of the injection-molded control valves, which is not possible with the prior art described in the aforementioned document. These functional components can also have a multi-part structure to achieve a required complex structure.

Subsequently, the shaft together with the functional component is placed into a mold to produce the control valves, e.g., by injection molding. After production of the valves, the functional component is thus trapped in the gap between the valves on the shaft, since the functional component can no longer be removed due to the dimensions of the control valves. The production method is thus a prerequisite for producing a control valve assembly with a complex structure. The complex structures are achieved by the functional components.

According to a further embodiment of the invention, the functional components are rotatably supported on the shaft. This is especially important if the functional component is used to support the shaft in the mounting location.

A further embodiment of the invention provides that the functional component be locked against rotation relative to the shaft. This is useful, for example, in the case of an actuating lever that is intended to convert the actuating force of, for instance, a connecting rod into a torque on the shaft.

A further embodiment of the invention provides that the functional component be axially fixed on the shaft. As a result, the shaft is easier to handle with the premounted functional components, since they cannot slip axially. This especially facilitates the insertion of the shaft into the mold. Furthermore, axial fixation can also be based on functional aspects. It is possible, for instance, to fix the shaft axially in the mounting location to prevent frictional wear of the control valves in the associated channels.

According to a further embodiment of the invention, another functional unit in addition to the valves can be formed on the shaft. This unit, like the valves, is directly injection-molded onto the shaft using the same or a different mold. Particularly suitable for this purpose is a knuckle lever intended to transmit an actuating force to the shaft, whereby an actuating torque is created to rotate the control valves.

The actuating lever is advantageously provided in the center of the shaft. This ensures a balanced power distribution over all the control valves. It also reduces the tolerances during the switching process, which may occur between the individual valves due to torsion of the shaft.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
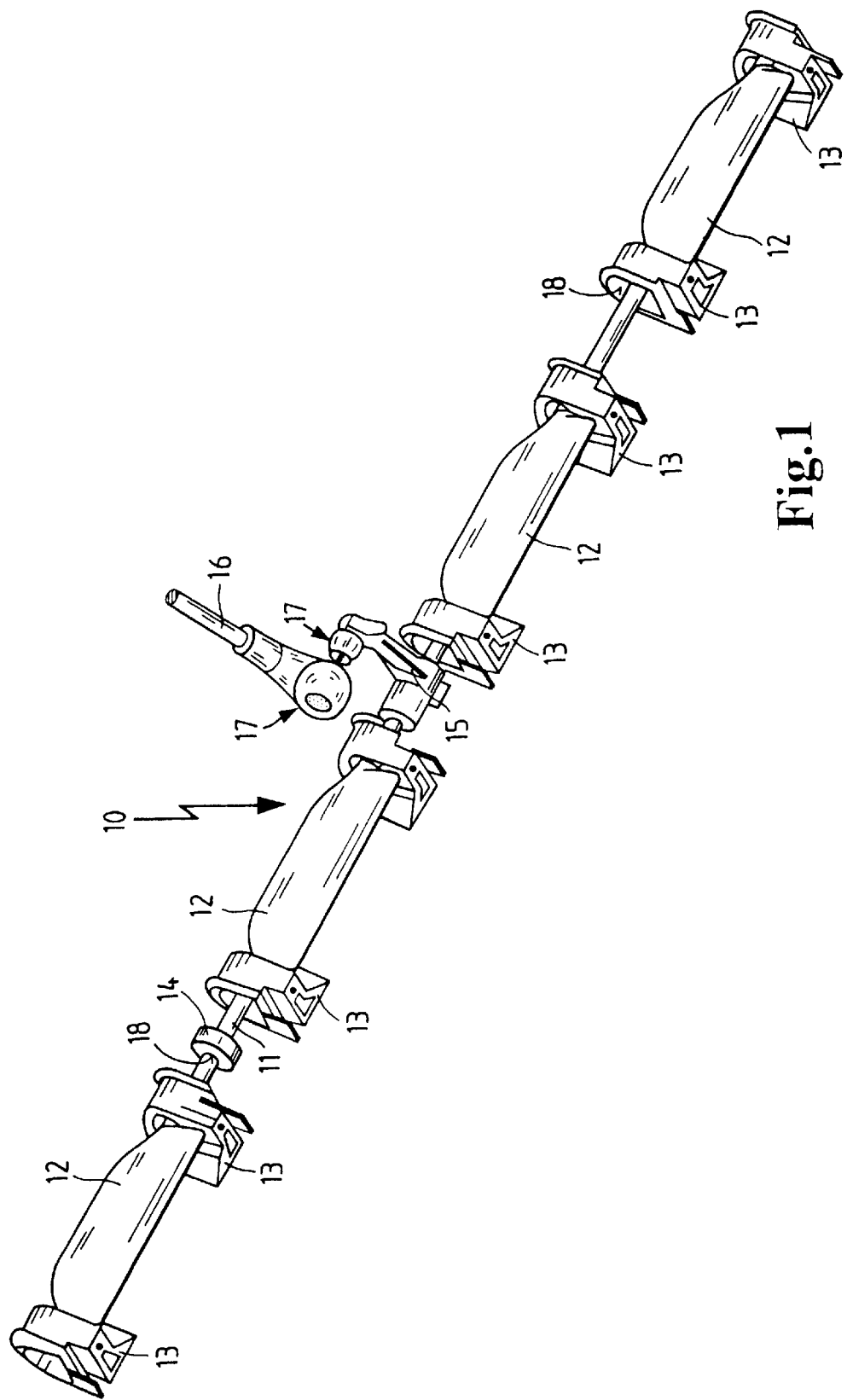
FIG. 1 is a perspective view of a valve assembly produced by the method according to the invention.

A control valve assembly 10 comprises a shaft 11 made, for instance, of steel, onto which e.g., synthetic resin control valves 12 are injection-molded. These control valves are spaced apart from one another and plastic bearing blocks 13 are arranged therebetween. Furthermore, an axial limit stop 14 is provided, which fixes the shaft axially in the mounting location.

Likewise injection-molded is an additional functional unit 15 in the form of an actuating lever, which can be connected with a partially illustrated connecting rod 16 via a ball-and-socket joint 17. This makes it possible, for instance, to control the control valve assembly using a vacuum actuator (not shown).

Axial limit stop 14 and bearing blocks 13 are functional components in terms of the invention. They are provided with passages 18 through which shaft 11 can be pushed. Since the passages are closed, the functional components can be mounted only by slipping them onto the shaft from the end. Consequently, the injection-molded control valves 12 prevent any subsequent detachment of the functional components.

Figure 2:
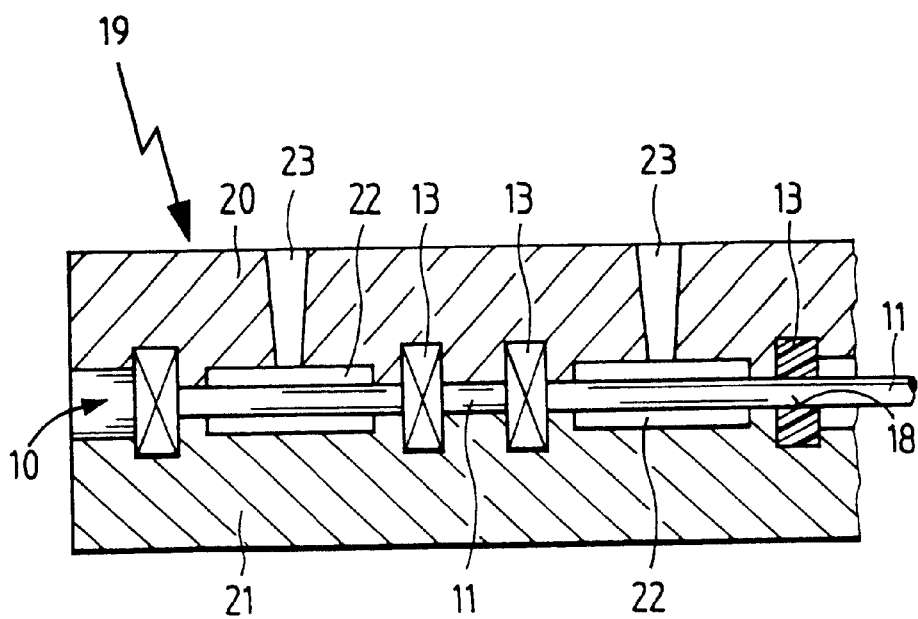
FIG. 2 is a schematic cross section through the valve assembly inside the mold, prior to injection of the synthetic resin material for the valves.

FIG. 2 shows a mold 19 comprising an upper mold half 20 and a lower mold half 21. An unfinished part for a control valve assembly, comprising shaft 11 and bearing blocks 13 (illustrated schematically), is placed between the two mold halves. Also visible are cavities 22 inside the mold, which can be filled with synthetic resin material via feeders 23 in the upper mold half 20. This causes the control valves to be injection-molded around shaft 11 to form the control valve assembly.

Figure 3:
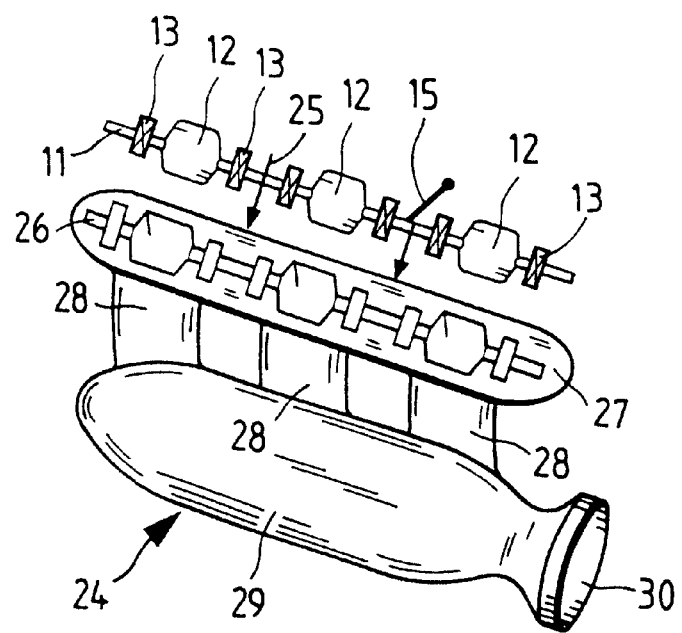
FIG. 3 is a schematic perspective view of the installation of the valve assembly in an intake manifold.

A schematic perspective view illustrating the installation of a control valve assembly corresponding to control valve assembly 10 (shown here with only 3 control valves 12) in an intake manifold 24 is shown in FIG. 3. The joining direction is indicated by arrows 25. The control valve assembly comprises the described bearing blocks 13 and a functional unit 15 in the form of an actuating lever. The entire control valve assembly is installed in a recess 26 in cylinder head flange 27. Control valves 12 communicate with intake channels 28 of intake manifold 24, which branch off from a common plenum 29. The plenum has a flange 30 for a throttle valve (not shown) of the intake tract for the internal combustion engine.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method for producing an assembly of control valves on a common shaft, wherein the control valves are originally formed by molding onto the shaft, said method comprising the steps of:

placing at least one prefabricated functional component on the shaft, said functional component having a closed passage in which the shaft is received;

placing the shaft with the functional component thereon into a mold, and molding the control valves on the shaft with said mold such that the at least one functional component is located between two molded control valves; said molded valves preventing the functional component from being detached from the shaft.

2. A method according to claim 1, wherein the at least one functional component is rotatably supported on the shaft.

3. A method according to claim 2, wherein the at least one functional component comprises a bearing block.

4. A method according to claim 1, wherein the functional component is locked against rotation relative to the shaft.

5. A method according to claim 1, wherein the functional component is axially fixed on the shaft.

6. A method according to claim 1, wherein, in addition to the valves, a further functional component is molded onto the shaft.

7. A method according to claim 1, wherein said further functional component comprises an actuating lever for actuating the shaft.

8. A method according to claim 7, wherein said actuating lever is arranged centrally on said shaft between two control valves.

* * * * *